(No Model.)  2 Sheets—Sheet 2.

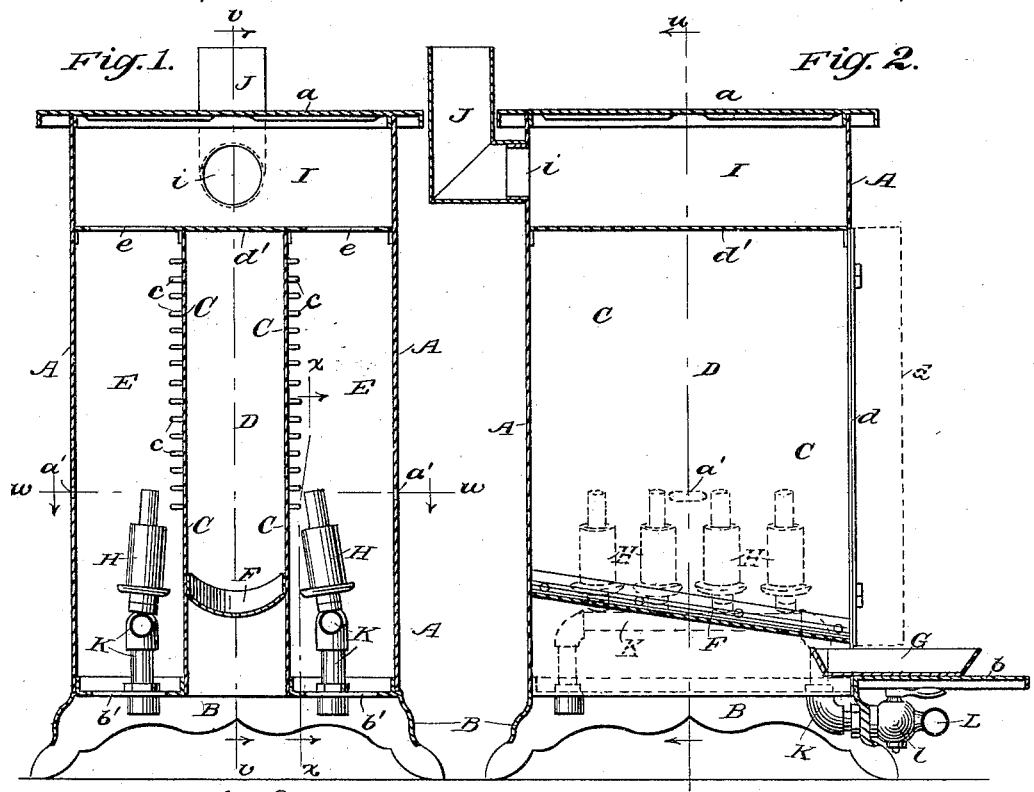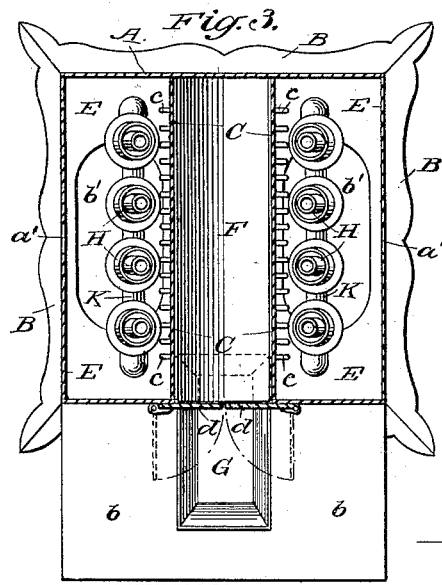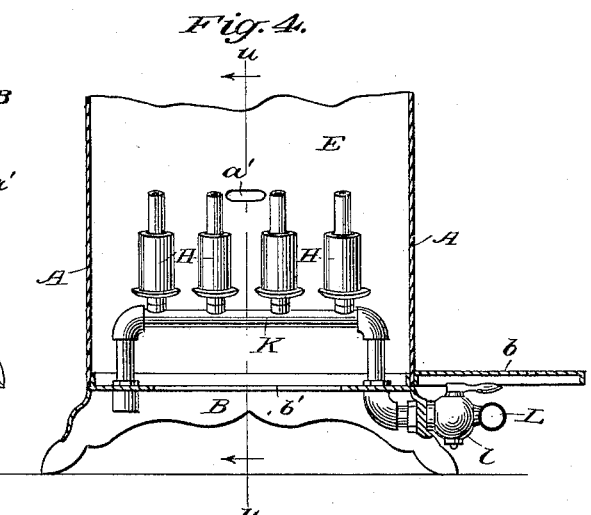

G. NOAKES & J. GIBBONS.
COOKING APPARATUS.

No. 463,073. Patented Nov. 10, 1891.

WITNESSES·
J. A. Criswell
C. Sedgwick

INVENTORS.
G. Noakes
J. Gibbons
BY Munn & Co.
ATTORNEYS

UNITED STATES PATENT OFFICE.

GEORGE NOAKES, OF NEW YORK, N. Y., AND JAMES GIBBONS, OF JERSEY CITY, NEW JERSEY, ASSIGNORS TO THE GIBBONS SUPERHEATING COMPANY, OF JERSEY CITY, NEW JERSEY.

COOKING APPARATUS.

SPECIFICATION forming part of Letters Patent No. 463,073, dated November 10, 1891.

Application filed May 10, 1890. Serial No. 351,243. (No model.)

*To all whom it may concern:*

Be it known that we, GEORGE NOAKES, of the city, county, and State of New York, and JAMES GIBBONS, of Jersey City, in the county of Hudson and State of New Jersey, have invented a new and Improved Cooking Apparatus, of which the following is a full, clear, and exact specification.

Our invention has for its object to provide a simple, efficient, compact, and self-contained apparatus intended more especially for cooking by the aid of fluid fuel or gas and adapted for quickly and economically broiling, boiling, or frying food supplies of various kinds.

The invention consists in certain novel features of construction and combinations of parts of the cooking apparatus, all as hereinafter described and claimed.

Reference is to be had to the accompanying drawings, forming a part of this specification, in which similar letters of reference indicate corresponding parts in all the figures.

Figure 5:
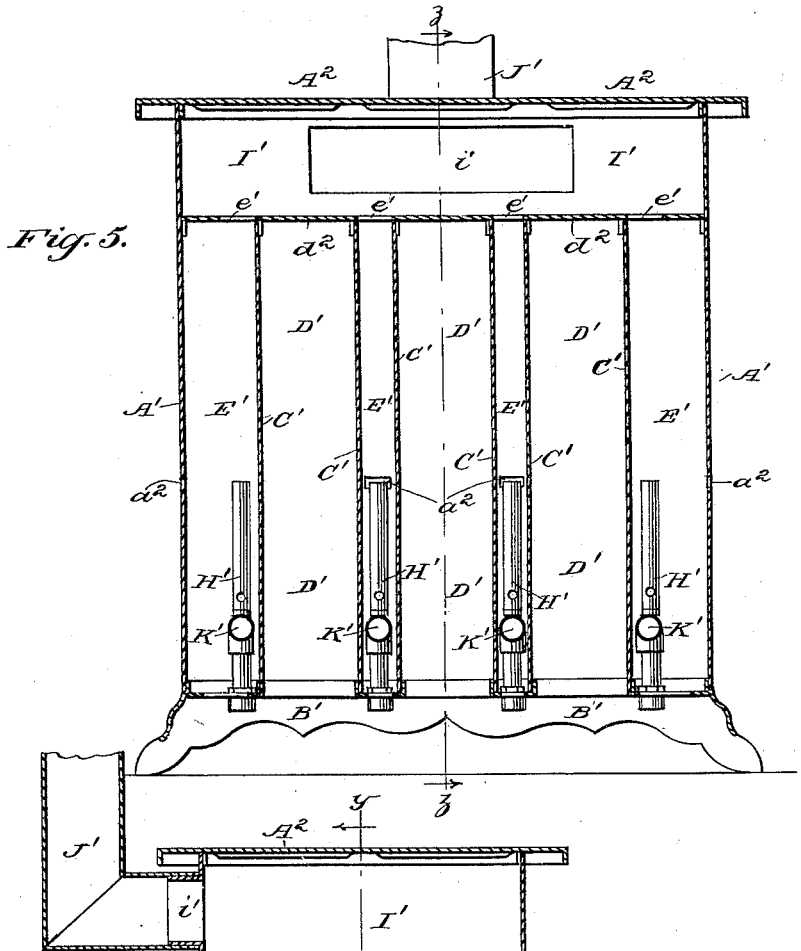

Figure 1 is a front vertical sectional view of our improved cooking apparatus, taken on the lines $u$ $u$ in Figs. 2 and 4. Fig. 2 is a central vertical section thereof, taken on the line $v$ $v$ in Fig. 1. Fig. 3 is a plan view, in horizontal section, on the line $w$ $w$ in Fig. 1. Fig. 4 is a detail vertical sectional side view taken on the line $x$ $x$ in Fig. 1. Fig. 5 is a front vertical sectional view taken on the line $y$ $y$ in Fig. 6, and shows how two, three, or more broilers may be arranged within an outer casing and beneath a hot-products chamber, on the top of which boiling, or frying, or griddle-cake baking may be done; and Fig. 6 is a vertical side sectional view taken on the line $z$ $z$ in Fig. 5.

Figure 6:
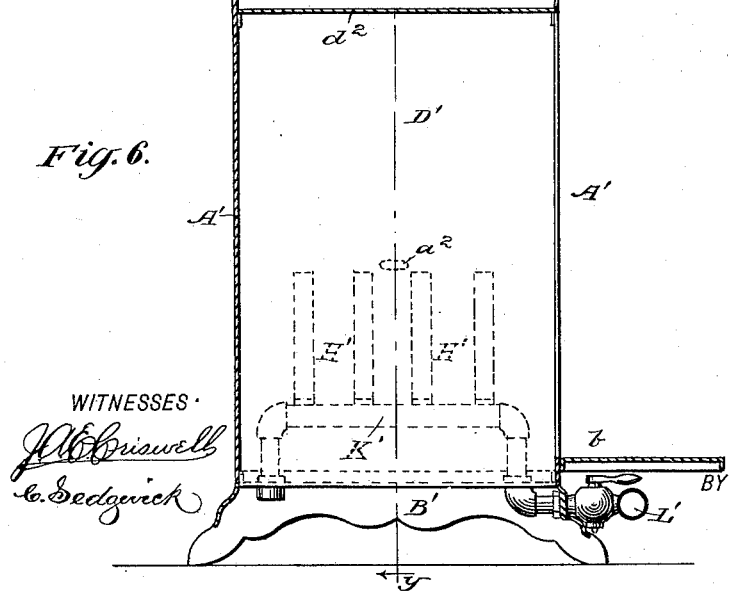

Our improved cooking apparatus, as more especially designed for household use and shown in Figs. 1, 2, 3, and 4 of the drawings, will first be particularly described, and we will then explain the apparatus shown in Figs. 5 and 6 of the drawings, and which is intended chiefly for use in hotels or restaurants, where numerous orders of food have to be cooked at once.

Referring now to Figs. 1 to 4 of the drawings, it will appear that we make the cooking apparatus with an outer casing or frame A, which may be sheet or cast metal, and preferably is provided with a suitable base B, having legs, and sustaining the entire structure. The lower portion of the casing A is divided by two opposing and preferably parallel walls or plates C C into three compartments, the center one D, between the walls C C, being the broiling-chamber of the apparatus, while the two outer chambers E E, one at each side of the chamber D, are fire-chambers. The broiling-chamber is preferably closed at the top and rear side, and at the front is shown provided with a door or doors $d$, hinged to the casing A, and by which said chamber may be closed. We prefer to use two doors, which are shown closed in full lines in Figs. 2 and 3 of the drawings and are shown open in dotted lines.

It is the intention to support centrally within the broiling-chamber in any approved manner any suitably-formed gridiron device holding a steak, chop, fish, or other substance, to be broiled by heat radiated from both side walls C C of the broiling-chamber to cook the substance from or at both sides at once. The fat drippings fall into an inclined pan or tray F, which is fixed or held in the lower part of the broiling-chamber and drains into a receiving-pan G, or other receptacle, placed on the ledge-plate $b$, which projects forward from the base B of the apparatus. We may provide one or both faces of each of the cooking-walls C C of the broiling-chamber with series of pins $c$, which increase their heat-radiating effect. These pins are shown only at the outer faces of the cooking-walls, where they receive directly the flames from fluid-fuel and preferably "Bunsen" burners H, four of which are shown in each fire-chamber E of the apparatus, and are hereinafter mentioned.

The upper horizontal plate $d'$, which forms a top to the fire and broiling chambers, is set sufficiently below the top plate $a$ of the casing to provide a chamber I above said chambers to receive the hot products from both fire-chambers through suitable openings $e$ $e$, made in their top plate $d'$, and the hot products are led off from the chamber I through an outlet $i$ in the casing to a connected pipe J, which may lead to any convenient flue. The top plate $a$ is provided with openings and lids therefor, allowing ordinary boiling operations to be carried on in pots or kettles set in the holes. A griddle may also be set on the top plate for baking cakes while broiling is being done in the chamber D between the two fire-chambers, which also supply heat for cooking on top of the apparatus.

It will be understood that the two opposing fire-chambers may be entirely independent structures, so located in juxtaposition as to permit their inner opposing imperforate cooking-walls to broil both sides at once of meats or other substances held between them. It will, however, be seen that compactness, portability, efficiency, economy in manufacture, and adaptability of both fire-chambers to discharge their waste hot products into a common chamber and thence to a single draft or exit-flue are all promoted by building the two contiguous fire-chambers within the same casing or frame or in one self-contained structure.

Any means may be used in the fire-chambers to heat their inner heat-radiating or cooking walls C C; but we may use the above-named Bunsen burners H shown in the drawings, and which range along the cooking-walls within the fire-chambers, and are especially well adapted for this work. These burners are not claimed herein, as they are substantially shown and described in a prior patent, No. 398,505, granted to James Gibbons February 26, 1889. Openings $b'$ $b'$ in the base B admit air to maintain combustion at the burners, and side openings $a'$ $a'$ in the casing allow introduction of a taper to light the gas at the burners, the gas being admitted to the burners through nipples on the supply-pipe K, fed from a service pipe or rail L, having suitable valves or cocks $l$ outside of or at the front of the casing.

In the cooking apparatus shown in Figs. 5 and 6 of the drawings and intended for hotel or restaurant use the casing A', which is on a base B', is large enough to accommodate three broiling-chambers D' D' D' and four adjacent fire-chambers E' E' E' E' for heating their cooking-walls C'. The burners H' in these fire-chambers are of the ordinary Bunsen type and communicate with fluid-fuel-supply pipes K', which all open to a common service-pipe L'. The burners in the intermediate fire-chambers E' are more numerous or more powerful than the burners in the two end or outside fire-chambers, as each series of intermediate burners heats two cooking-walls, whereby adjacent cooking-walls of two independent broiling-chambers are heated by the same fire or flame, while each outside series of burners heats but one cooking-wall of the outer broiling-chambers. The base B' has openings admitting air to maintain combustion at the burners, and the casing A² has openings $a^2$ to admit a taper for lighting the gas at the burners. A partition $d^2$, which forms the top wall of the broiling and fire chambers, has openings $e'$ leading to an upper hot-products chamber I', which is formed in the casing A' beneath the top plate A², which has pot-holes and covers, allowing boiling, stewing, or griddle-cake baking on top of the apparatus.

The broiler is very effective in operation, as meats, fowl, or fish, cut or divided in the usual manner for cooking by broiling and hung or held centrally in the broiling-chamber D or D' between its opposing cooking-walls C or C' will be broiled evenly and thoroughly and nicely browned, from three to eight minutes only being required to broil various food products at both sides at once and so quickly that the juices are not allowed to escape with the fat drippings, and whereby the peculiar flavor of the cooked food is retained, leaving it most tender, palatable and nourishing.

In its simplest useful form our broiler comprises two contiguous imperforate cooking walls or plates, so placed in juxtaposition that food substances will be broiled nicely between their opposing hot or incandescent surfaces, and with marked economy of time and labor over broiling substances one side at a time over open coal or wood or gas fires, and with vastly improved results in retaining the best nourishing qualities of the food. It will be especially noticed that the cooked food is not contaminated by gases or deleterious hot products or dust escaping from the sources of heat, which bring the contiguous cooking-walls to proper high temperatures to evenly broil the food sustained between them. This desirable result is due to the construction of the cooking-walls, which will not allow passage of hot products, gases, or dust from the sources of heat behind them into the broiling-chamber. Our cooking-walls thus are clearly distinguishable from open-bar fire-grates or areas of wire-screen material, which allow deleterious hot products to pass to the food being broiled to contaminate it. Obviously a small hole or two in the cooking-walls would not, in view of the moderate draft through the fire-chambers, allow deleterious gases to pass to the food. Hence the term "imperforate" is not to be construed in its strictest sense, but is to be considered as meaning substantially imperforate, so as not to allow passage of injurious gases through them into the broiling-chamber upon the food.

The broiling-chamber of our apparatus is not to be compared with the ovens of ordinary stoves or ranges, as the difference is quite marked both structurally and operatively.

As regards structure, it will be noticed that the opposing cooking-walls of the broiling-chamber of our apparatus are set quite closely to each other or stand only about from four to six inches apart, and they are heated to a very high temperature. On the other hand the opposing side walls of ordinary stove or range ovens are set much farther apart and are not subjected to so high heat in use. These differences are very material and provide for widely-different cooking processes, so much so that what can be done in or by one structure cannot be accomplished in the other.

Operatively considered, we remark that meats, fish, or other food supplies to be broiled are cut comparatively thin and are necessarily brought quite close to a very hot fire or heating-surface and most free circulation of air is given around the food to assure its being cooked through quickly and nicely browned while retaining as far as possible its nutritious juices. On the other hand a baking or roasting operation is performed much more slowly and upon a comparatively large or thick body of food in order to cook it through and through and in an oven having comparatively widely-separated side walls and through which there is comparatively little or no circulation of air, and the oven-walls are necessarily kept at a much lower temperature than a broiling fire or hot surface. Very quick cooking—such as is required in broiling—is impracticable in an ordinary stove or range oven, and if attempted there under extraordinary heating conditions it would only burn the exterior surfaces of the food and leave the inside of it uncooked, thereby spoiling it. The results are so different that it would be quite as impossible to properly and quickly broil a steak at both sides at once in an ordinary stove-oven, as it would be to thoroughly roast or bake a thick joint of meat or loaf of bread in the broiling-chamber of our apparatus without burning the outside of the food, as will readily be understood.

Having thus fully described our invention, we claim as new and desire to secure by Letters Patent—

1. A cooking apparatus made with two opposing contiguous imperforate cooking walls or plates forming a broiling-chamber between them and a source of heat behind said cooking-walls, substantially as described.

2. A cooking apparatus made with two contiguous fire-chambers having inner opposing imperforate cooking-walls forming a broiling-chamber between them and a source of heat within the fire-chambers, the fire and broiling chambers being arranged within a casing or frame in one self-contained structure, substantially as described.

3. A cooking apparatus having a broiling-chamber the side walls of which are imperforate, fire-chambers at the sides of the broiling-chamber, and longitudinal series of fluid-fuel burners ranging in said fire-chambers along the inner walls thereof, substantially as described.

4. A cooking apparatus made with a casing or frame, two contiguous fire-chambers therein having inner opposing cooking-walls forming a broiling-chamber between them and a source of heat within the fire-chambers, said casing having another chamber receiving and leading off the hot products from both fire-chambers, substantially as described.

5. A cooking apparatus made with two contiguous opposing fire-chambers having inner imperforate cooking-walls forming a broiling-chamber between them and a source of heat in the fire-chamber, said broiling-chamber having end doors movable to facilitate original heating of the cooking-walls and to admit air, substantially as described.

6. A cooking apparatus made with two or more broiling-chambers, each having opposing contiguous cooking-walls and fire-chambers at both sides of the broiling-chambers, substantially as described, whereby adjacent cooking-walls of two independent broiling-chambers will be heated by the same fire, as set forth.

7. A cooking apparatus made with two or more broiling-chambers, each having opposing contiguous cooking-walls and fire-chambers at both sides of the broiling-chambers, all arranged within a common casing or frame, said casing also provided with an upper chamber receiving and leading off the hot products from all the fire-chambers, substantially as described.

GEORGE NOAKES.
JAMES GIBBONS.

Witnesses:
HENRY L. GOODWIN,
EDGAR TATE.